C. A. SCHNEIBLE.
FAUCET.
APPLICATION FILED DEC. 19, 1910.
1,050,176.
Patented Jan. 14, 1913.
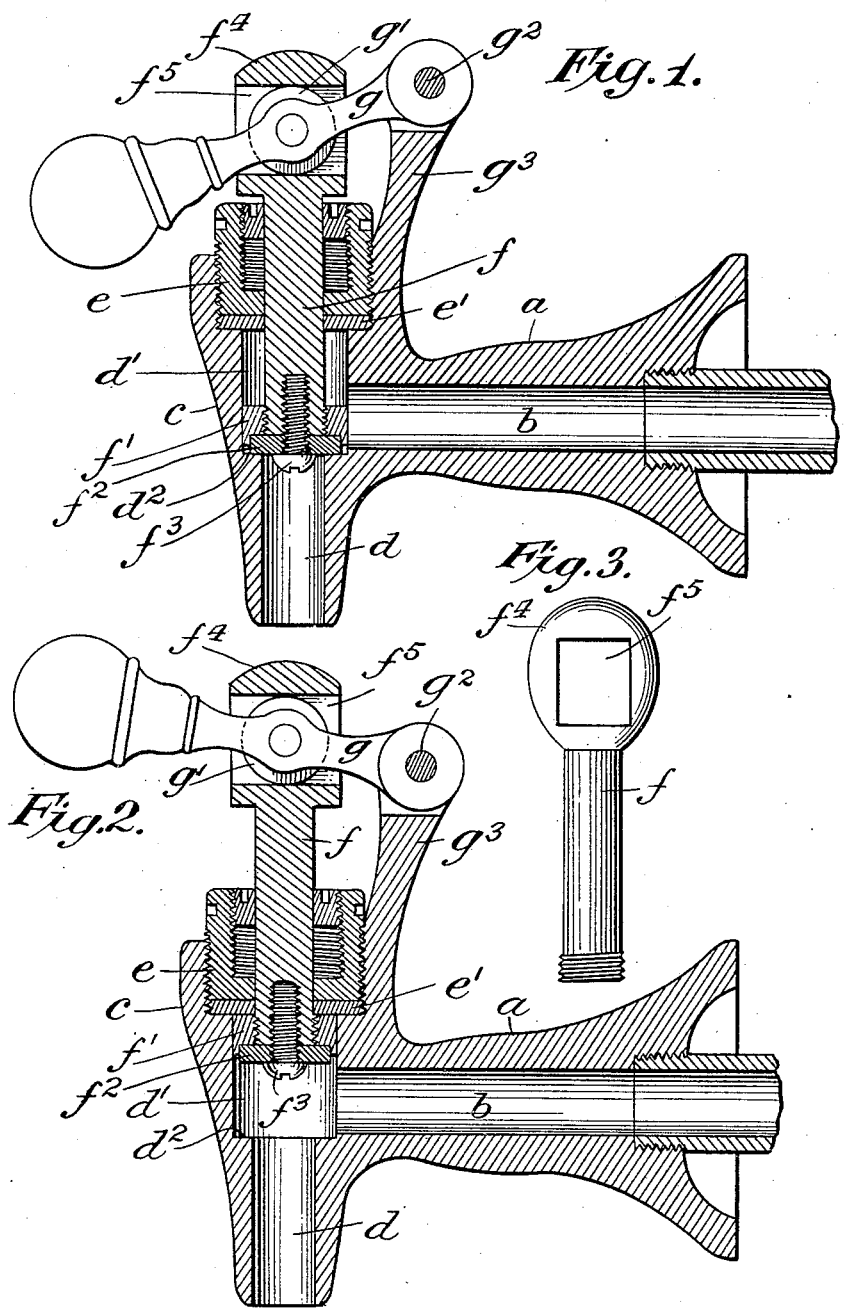

UNITED STATES PATENT OFFICE.

CARL A. SCHNEIBLE, OF NEW YORK, N. Y.

FAUCET.

1,050,176.

Specification of Letters Patent. Patented Jan. 14, 1913.

Application filed December 19, 1910. Serial No. 598,130.

*To all whom it may concern:*

Be it known that I, CARL A. SCHNEIBLE, a citizen of the United States, residing in the borough of Manhattan of the city of New York, in the State of New York, have invented certain new and useful Improvements in Faucets, of which the following is a specification, reference being had to the accompanying drawing, forming a part hereof.

This invention relates especially to faucets such as are used for the drawing of beer and has for its object to produce an improved faucet in which the valve shall not be required to be ground to its seat, shall be held both in its open and in its closed position by the pressure of the liquid, and shall be moved from one position to the other by a slight movement of the operating handle, and in which, when the valve is open, a free passage for the flow of beer shall be afforded, without such restrictions as are liable to cause friction and foaming of the beer.

It is also the object of the invention to provide a simple construction which can be easily and thoroughly cleaned, in which there shall be no angles for the retention of beer and from which there shall be no drip after the closing of the valve.

The invention will be more fully explained hereinafter with reference to the accompanying drawing in which it is illustrated and in which, Figure 1 is a view in section of the improved faucet, showing the valve in its closed position. Fig. 2 is a similar view showing the valve in its open position. Fig. 3 is a detail view of the plunger head.

The body $a$ of the faucet has a straight, axial bore $b$ and the vertical head $c$ has also a straight axial bore $d$ which is enlarged, as at $d'$, to form a valve chamber with a valve seat $d^2$ at its lower end. In the upper end of the head $c$ is threaded a stuffing box $e$, of usual construction, which is preferably seated upon a washer $e'$ formed therefor at the upper end of the valve chamber $d'$. A sliding plunger $f$, moving through the stuffing box $e$, has secured thereon at its lower end a head $f'$ of larger diameter than the plunger so as to form a rear or upper face and preferably recessed at its lower end to receive a washer $f^2$, the latter being preferably held to the plunger by a screw $f^3$. The end $f^4$ of the plunger is formed with a recess $f^5$ to receive an anti-friction roller $g'$ which is carried by the operating handle $g$. The latter is pivoted, as at $g^2$, upon a bracket $g^3$.

The valve chamber $d'$, which forms the connection between the bore $b$ and the bore $d$, has its valve seat $d^2$ just below the lower edge of the bore $b$ and is extended above the upper edge thereof far enough to receive the head $f'$ and the washer $f^2$ so that the washer, when the valve is open, stands above the upper edge of the bore $b$, while the height of the head $f'$ is less than the diameter of the bore $b$ so that the static pressure of the liquid may be exerted upon the upper face of the head $f'$ when the valve is closed.

It will now be seen that when the valve is closed it is held in its closed position, with the washer $f^2$ upon the valve seat $d^2$, by the static pressure of the liquid, and that when the valve is open it is also held in its open position by the static pressure of the liquid against the lower face of the head $f'$ and the washer $f^2$, no mechanical devices being required to hold the valve securely in either position. Furthermore, only a slight movement of the operating handle $g$ is required to move the valve from closed to open position or vice versa. It will also be observed that the opening through the head of the faucet extends straight through from top to bottom, so that by removing the stuffing box and withdrawing the plunger it is possible to clean the faucet easily and thoroughly. When the valve is in its open position it stands wholly above the bore $b$ and the flow of the liquid is therefore unobstructed. There are no cavities in which the liquid can stand undisturbed or sediment gather and as the bore $d$ below the valve is straight, all of the liquid beyond the valve is discharged immediately upon the closing of the valve and there can be no drip as is the case when the passage beyond the valve is curved.

Various other changes in details of construction and arrangement may be made to suit different conditions of use and it will be understood, therefore, that the invention is not restricted to the precise construction and arrangement shown.

I claim as my invention:

1. A faucet having a body with a vertical axial bore extending across the end of the horizontal axial bore of the body and enlarged opposite the end of the horizontal axial bore of the body to form a cylindrical valve chamber having a valve seat at its lower end below the end of the horizontal axial bore of the body, a stuffing box above the valve chamber and a sliding plunger having a plunger head of greater diameter than the plunger adapted to fit and be movable in the cylindrical valve chamber and having a thickness less than the diameter of the horizontal axial bore of the body, the valve chamber being extended above the end of the horizontal axial bore of the body a distance greater than the thickness of the plunger head, an arm extending above the level of said stuffing box, a lever pivoted to said arm and adapted to reciprocate said plunger.

2. A faucet having a body with a vertical axial bore extending across the end of the horizontal axial bore of the body and enlarged opposite the end of the horizontal axial bore of the body to form a cylindrical valve chamber having a valve seat at its lower end below the end of the horizontal axial bore of the body, a stuffing box above the valve chamber and a sliding plunger having a plunger head of greater diameter than the plunger adapted to fit and be movable in the cylindrical valve chamber and having a thickness less than the diameter of the horizontal axial bore of the body, the valve chamber being extended above the end of the horizontal axial bore of the body a distance greater than the thickness of the plunger head, the upper end of said plunger provided with a passage extending horizontally thereof, an integral arm extending above the level of said stuffing box, a lever pivoted to said arm and extending through the horizontal passage in said plunger to thereby reciprocate the same.

This specification signed and witnessed this 16th day of December, A. D., 1910.

CARL A. SCHNEIBLE.

Signed in the presence of—
CHARLES SCHNEIBLE,
RACHEL F. FRANKENTHAL.

---

Copies of this patent may be obtained for five cents each, by addressing the "Commissioner of Patents, Washington, D. C."